UNITED STATES PATENT OFFICE 2,011,219

VULCANIZATION OF RUBBER

Marion W. Harman, Nitro, W. Va., assignor to The Rubber Service Laboratories Company, Akron, Ohio, a corporation of Ohio No Drawing. Application November 24, 1933, Serial No. 699,638

13 Claims. (Cl. 18—53)

The present invention relates to the vulcanization of rubber by an improved process wherein there is employed a preferred class of compounds which improve the action of the accelerator used in the vulcanization process.

Many accelerators, which are particularly strong in their accelerating action and are otherwise desirable, cannot effectively be employed commercially in certain processes for the reason that such stocks into which they are incorporated tend to "scorch" or vulcanize during the milling operation or on storage of the compounded stock. One class of accelerators which exhibit this undesirable property comprise reaction products of organic bases and thiazoles, as for example mercaptothiazoles.

One object then of the present invention is to facilitate and increase the use of reaction products of organic bases and thiazoles by reducing their "scorching" properties. Other and further objects of the invention will be apparent from the following description and accompanying examples.

In order to show the lack of "scorch", or if preferred to so call it, retarding of the initial cure, plasticity data were obtained on the uncured rubber stocks containing one of the preferred class of retarders and compared to the same uncured stocks containing no retarder. The plasticity data on the uncured rubber stocks were obtained using the Williams Plastometer described by Williams, Industrial and Engineering Chemistry vol. 16, page 362, (1924)—see also Krall, ibid, vol. 16, page 922 (1924). A brief description of the method employed in determining the plasticity figures set forth below follows. Cylinders of two cubic centimeters in volume are cut from uncured rubber compounded stock and placed in a constant temperature oven for the times and at the temperatures indicated. After this initial heating, called "preheating", the test pieces of the uncured stock are placed in the Williams Plastometer, which is in reality a plastometer press, having a movable upper weighted plate connected to a gauge graduated in 1/100 millimeters so as to measure the distance between the upper and lower plates of the press. The plastometer is maintained in a constant temperature oven held at 70° C. During the plasticity test the preheated test piece remains in the plastometer with the upper movable plate resting on it for exactly 3 minutes, at the end of which period the reading on the gauge is taken, which reading is called the plasticity figure. This plasticity figure is in reality the height of the rubber test cylinders in 1/100 millimeters after the upper movable plate of the press has rested on it for the period of 3 minutes designated. The lower figures indicate a less curing of the stock or a less "scorchy" stock.

As examples of the preferred class of retarders are aniline acid phthalate, ethylene diamine acid phthalate, cyclohexyl amine acid phthalate, beta naphthylamine acid phthalate and triethylene tetramine acid phthalate.

One method employed in the preparation of aniline acid phthalate comprises dissolving substantially 0.5 of a mole of phthalic anhydride in a convenient amount of hot water and adding thereto a small excess over 0.5 of a mole of aniline. The clear solution thereby formed was cooled to 15° C. and the white crystals which precipitated were filtered off and dried. After drying the crystals melted at 155° C. with decomposition.

Ethylene diamine acid phthalate was conveniently prepared by dissolving 0.1 of a mole of ethylene diamine in a convenient quantity of water, then adding 0.2 of a mole of phthalic acid thereto and heating at refluxing temperature until solution was complete. On cooling of the solution white crystals of ethylene diamine acid phthalate separated out, which, after filtering and drying, melted at 234–236° C.

Cyclohexyl amine acid phthalate was prepared by reacting substantially equi-molecular proportions of cyclohexyl amine and phthalic acid in a manner analogous to that employed in preparing ethylene diamine acid phthalate. A white crystalline product was obtained melting at 140–142° C.

Beta naphthylamine acid phthalate was conveniently prepared by dissolving substantially equi-molecular proportions of beta naphthylamine and phthalic acid in a convenient quantity of boiling ethyl alcohol. After cooling, green crystals were obtained, which, after filtering, washing with ethyl alcohol and drying, melted at 200–205° C.

Triethylene tetramine acid phthalate was conveniently prepared by dissolving substantially 0.05 of a mole of triethylene tetramine and 0.2 of a mole of phthalic acid in a convenient quantity of hot water. The solution on cooling precipitated a yellow crystalline product melting at 152–155° C.

As examples of the operation of this invention rubber stocks were compounded employing the reaction product of mercaptobenzothiazole and a mixture of substantially 50% cyclohexyl amine and 50% dicyclohexyl amine prepared as described in my copending application, Serial No. 665,568, filed April 11, 1933, as the accelerator and aniline acid phthalate, ethylene diamine acid phthalate, cyclohexyl amine acid phthalate, beta naphthylamine acid phthalate and triethylene tetramine acid phthalate as retarders. Thus the following stocks were compounded:

TABLE I

|  | Stock A | Stock B | Stock C | Stock D | Stock E | Stock F |
|---|---|---|---|---|---|---|
| Pale crepe rubber | 100.0 | 100.0 | 100.0 | 100.0 | 100.0 | 100.0 |
| Zinc oxide | 8.0 | 8.0 | 8.0 | 8.0 | 8.0 | 8.0 |
| Sulfur | 2.5 | 2.5 | 2.5 | 2.5 | 2.5 | 2.5 |
| Stearic acid | 0.5 | 0.5 | 0.5 | 0.5 | 0.5 | 0.5 |
| Reaction product of mercaptobenzothiazole and the mixed cyclohexyl amines described | 0.3 | 0.3 | 0.3 | 0.3 | 0.3 | 0.3 |
| Aniline acid phthalate |  | 0.45 |  |  |  |  |
| Ethylene diamine acid phthalate |  |  | 0.45 |  |  |  |
| Cyclohexyl amine acid phthalate |  |  |  | 0.45 |  |  |
| Beta naphthylamine acid phthalate |  |  |  |  | 0.45 |  |
| Triethylene tetramine acid phthalate |  |  |  |  |  | 0.45 |

The results on the testing of the vulcanized rubber stocks follow:

TABLE II

| Cure mins. | Steam pressure lbs./in.² | Stock | Modulus of lbs./in.² at 500% | Elasticity in elongations of 700% | Tensile at break in lbs./in.² | Ult. elong. percent |
|---|---|---|---|---|---|---|
| 15 | 20 | A | 139 | 267 | 1065 | 1010 |
| 15 | 20 | B | Did not cure sufficient to test |  |  |  |
| 15 | 20 | C | do |  |  |  |
| 15 | 20 | D | do |  |  |  |
| 15 | 20 | E | No test made |  |  |  |
| 15 | 20 | F | do |  |  |  |
| 30 | 20 | A | 343 | 1175 | 3020 | 865 |
| 30 | 20 | B | 249 | 858 | 1885 | 845 |
| 30 | 20 | C | 266 | 881 | 2215 | 855 |
| 30 | 20 | D | 371 | 1370 | 3200 | 850 |
| 30 | 20 | E | 190 | 493 | 1675 | 930 |
| 30 | 20 | F | 201 | 628 | 1935 | 920 |
| 60 | 20 | A | 558 | 2325 | 4200 | 825 |
| 60 | 20 | B | 515 | 2080 | 3900 | 820 |
| 60 | 20 | C | 487 | 1890 | 3245 | 800 |
| 60 | 20 | D | 623 | 2370 | 3710 | 785 |
| 60 | 20 | E | 425 | 1650 | 3180 | 825 |
| 60 | 20 | F | 448 | 1650 | 3150 | 820 |
| 75 | 20 | A | 594 | 2505 | 3880 | 785 |
| 75 | 20 | B | 584 | 2470 | 3945 | 785 |
| 75 | 20 | C | 493 | 1970 | 3670 | 815 |
| 75 | 20 | D | 599 | 2415 | 3980 | 790 |
| 75 | 20 | E | 587 | 2250 | 3410 | 785 |
| 75 | 20 | F | 595 | 2310 | 3380 | 775 |
| 90 | 20 | A | 616 | 2480 | 4325 | 805 |
| 90 | 20 | B | 613 | 2575 | 4185 | 795 |
| 90 | 20 | C | 565 | 2070 | 3390 | 790 |
| 90 | 20 | D | 649 | 2665 | 4000 | 760 |
| 90 | 20 | E | 660 | 2485 | 3735 | 780 |
| 90 | 20 | F | 623 | 2405 | 3430 | 765 |

From the tensile and modulus data given in Table II, it is readily apparent that the preferred class of materials retard markedly the cure of organic base-thiazole reaction products. This retarding property is shown more clearly in the plasticity data which follows:

TABLE III

*Plasticity data*

| Preheating | | Stock | Plasticity figure |
|---|---|---|---|
| Time mins. | Temp. °F. | | |
| 120 | 200 | A | 263 |
| 120 | 200 | B | 122 |
| 120 | 200 | C | 49 |
| 120 | 200 | D | 45 |
| 120 | 200 | E | 32 |
| 120 | 200 | F | 74 |
| 180 | 200 | A | 503 |
| 180 | 200 | B | 245 |
| 180 | 200 | C | 60 |
| 180 | 200 | D | 67 |
| 180 | 200 | E | 40 |
| 180 | 200 | F | 70 |

The plasticity data set forth in Table III definitely shows that the preferred class of materials exhibit marked "anti-scorching" properties.

As a further embodiment of the present invention aniline acid phthalate was incorporated in a rubber stock wherein the crotonaldehyde derivative of the reaction product of hexamethylene tetramine and mercaptobenzothiazole, prepared as indicated in U. S. Patent 1,747,188 granted to Winfield Scott February 18, 1930, was employed as the accelerator. The following stocks were compounded:

TABLE IV

|  | Stock A | Stock B |
|---|---|---|
| Pale crepe rubber | 100 | 100 |
| Zinc oxide | 5 | 5 |
| Sulfur | 3 | 3 |
| Stearic acid | 1 | 1 |
| Crotonaldehyde derivative of the reaction product of hexamethylene tetramine and mercaptobenzothiazole | 0.75 | 0.75 |
| Aniline acid phthalate |  | 0.3 |

After vulcanization, the compounded rubber stocks possessed the following tensile and modulus characteristics:

TABLE V

| Cure mins. | Steam pressure lbs./in.$^2$ | Stock | Modulus of elasticity in lbs./in.$^2$ at elongations of | | Tensile at break in lbs./in.$^2$ | Ult. elong. percent |
|---|---|---|---|---|---|---|
|  |  |  | 500% | 700% |  |  |
| 30 | 30 | A | 376 | 1315 | 2645 | 815 |
| 30 | 30 | B | 318 | 1203 | 2830 | 845 |
| 45 | 30 | A | 459 | 1700 | 3140 | 810 |
| 45 | 30 | B | 502 | 1855 | 3230 | 800 |
| 60 | 30 | A | 549 | 2030 | 3300 | 780 |
| 60 | 30 | B | 618 | 2370 | 3340 | 765 |
| 90 | 30 | A | 565 | 2230 | 3320 | 770 |
| 90 | 30 | B | 678 | 2685 | 3500 | 750 |

The plasticity figures on the above uncured rubber stocks are given in Table VI.

TABLE VI

*Plasticity data*

| Preheating | | Stock | Plasticity figure |
|---|---|---|---|
| Time mins. | Temp. °F. | | |
| 120 | 200 | A | 260 |
| 120 | 200 | B | 197 |
| 180 | 200 | A | 365 |
| 180 | 200 | B | 307 |

As a further embodiment of the present invention aniline acid phthalate was incorporated in a rubber stock wherein the reaction product of piperidine and mercaptobenzothiazole was employed as an accelerator. The reaction product of piperidine and mercaptobenzothiazole is an extremely rapid and "scorchy" accelerator. The following stocks were compounded:

TABLE VII

|  | Stock A | Stock B |
|---|---|---|
| Pale crepe rubber | 100 | 100 |
| Zinc oxide | 5 | 5 |
| Sulphur | 3 | 3 |
| Stearic acid | 1 | 1 |
| Reaction product of piperidine and mercaptobenzothiazole | 0.4 | 0.4 |
| Aniline acid phthalate |  | 0.3 |

After vulcanization the above compounded rubber stocks possessed the tensile and modulus characteristics given in Table VIII.

TABLE VIII

| Cure mins. | Steam pressure lbs./in.$^2$ | Stock | Modulus of elasticity in lbs./in.$^2$ at elongations of | | Tensile at break in lbs./in.$^2$ | Ult. elong. percent |
|---|---|---|---|---|---|---|
|  |  |  | 500% | 700% |  |  |
| 30 | 30 | A | 810 | 3335 | 3925 | 725 |
| 30 | 30 | B | 995 | 3955 | 4440 | 725 |
| 45 | 30 | A | 890 | 3810 | 4020 | 710 |
| 45 | 30 | B | 1110 | 4300 | 4300 | 700 |
| 60 | 30 | A | 915 | 3900 | 3900 | 700 |
| 60 | 30 | B | 1080 | 4200 | 4200 | 700 |

The plasticity figures on the above uncured rubber stocks are given in Table IX.

TABLE IX

| Preheating | | Stock | Plasticity figure |
|---|---|---|---|
| Time mins. | Temp. °F. | | |
| 30 | 200 | A | 196 |
| 30 | 200 | B | 105 |
| 45 | 200 | A | 363 |
| 45 | 200 | B | 225 |

From the data given in Table IX it is shown that even when employed with extremely ultra rapid accelerators comprising reaction products of organic bases and thiazoles, as for example the reaction product of piperidine and mercaptobenzothiazole, the preferred class of materials exhibit "anti-scorching" and retarding properties. The reaction product of substantially equi-molecular proportions of para amino phenol and phthalic acid has also been prepared and found to possess the retarding properties typical of the class. The new class of retarders, for example aniline acid phthalate, have also been found to prevent "scorchiness" of the reaction product of 100% cyclohexyl amine and mercaptobenzothiazole.

The new and preferred class of retarders may be employed with other organic base-thiazole reaction products than those specifically described. Thus, organic bases have been reacted with amino mercaptobenzothiazole, chlormercaptobenzothiazole, mercaptotolylthiazole, mercaptoxylylthiazole and mercaptonaphthothiazole and their use in conjunction with a primary amine acid phthalate falls within the scope of the present invention.

This invention is not restricted to the use of the particular compounds given in the disclosure as examples, nor is it restricted to the use of the preferred class of compounds in the particular rubber mixes herein described. The invention is limited only by the claims attached hereto as part of the present specification.

What is claimed is:

1. The process of retarding the vulcanization of rubber which comprises heating rubber, sulfur and an accelerator comprising a reaction product of an organic base and a mercaptoarylthiazole, in the presence of a primary amine acid phthalate.

2. The process of retarding the vulcanization of rubber which comprises heating rubber, sulfur and an accelerator comprising a reaction product of an organic base and a mercaptobenzothiazole, in the presence of a primary aromatic amine acid phthalate.

3. The process of retarding the vulcanization of rubber which comprises heating rubber, sulfur and an accelerator comprising a reaction product of an organic base and a mercaptoarylthiazole, in the presence of aniline acid phthalate.

4. The process of retarding the vulcanization of rubber which comprises heating rubber, sulfur and an accelerator comprising a reaction product of an organic base and a mercaptoarylthiazole, in the presence of a primary aromatic amine acid phthalate.

5. The process of retarding the vulcanization of rubber which comprises heating rubber, sulfur and an accelerator comprising a reaction product of an organic base and a mercaptoarylthiazole, in the presence of aniline acid phthalate.

6. The process of retarding the vulcanization of rubber which comprises heating rubber, sulfur and an accelerator comprising a reaction product of an organic base and a mercaptobenzothiazole, in the presence of a primary aromatic amine acid phthalate.

7. The process of retarding the vulcanization of rubber which comprises heating rubber, sulfur and an accelerator comprising a reaction product of an organic base and mercaptobenzothiazole, in the presence of aniline acid phthalate.

8. The process of retarding the vulcanization of rubber which comprises heating rubber, sulfur and an accelerator comprising a reaction product of a cyclohexylamine and mercaptobenzothiazole, in the presence of aniline acid phthalate.

9. The process of retarding the vulcanization of rubber which comprises heating rubber, sulfur and an accelerator comprising a reaction product of substantially equi-molecular proportions of mercaptobenzothiazole and a mixture of substantially 50% of cyclohexylamine and substantially 50% of dicyclohexyl amine, in the presence of aniline acid phthalate.

10. The process of retarding the vulcanization of rubber which comprises heating rubber, sulfur and an accelerator comprising a reaction product of an organic base and mercaptobenzothiazole, in the presence of beta naphthylamine acid phthalate.

11. The process of retarding the vulcanization of rubber which comprises heating rubber, sulfur and an accelerator comprising a reaction product of an organic base and mercaptobenzothiazole, in the presence of ethylene diamine acid phthalate.

12. The process of retarding the vulcanization of rubber which comprises heating rubber, sulfur and an accelerator comprising the reaction product of substantially equi-molecular proportions of mercaptobenzothiazole and a cyclohexyl amine in the presence of beta naphthylamine acid phthalate.

13. The process of retarding the vulcanization of rubber which comprises heating rubber, sulfur and an accelerator comprising the reaction product of substantially equi-molecular proportions of mercaptobenzothiazole and a cyclohexyl amine in the presence of ethylene diamine acid phthalate.

MARION W. HARMAN.